US012769843B2

(12) United States Patent
Mizuno et al.

(10) Patent No.: US 12,769,843 B2
(45) Date of Patent: Oct. 20, 2026

(54) IMAGE PROCESSING APPARATUS, NOTIFICATION METHOD, AND NON-TRANSITORY COMPUTER-READABLE STORAGE MEDIUM

(71) Applicant: SEIKO EPSON CORPORATION, Tokyo (JP)

(72) Inventors: Satoshi Mizuno, Azumino (JP); Hitoshi Ishida, Yamagata-Mura (JP); Hiroshi Iguchi, Shiojiri (JP)

(73) Assignee: SEIKO EPSON CORPORATION, Tokyo (IN)

( * ) Notice: Subject to any disclaimer, the term of this patent is extended or adjusted under 35 U.S.C. 154(b) by 561 days.

(21) Appl. No.: 18/182,692

(22) Filed: Mar. 13, 2023

(65) Prior Publication Data

US 2023/0289447 A1 Sep. 14, 2023

(30) Foreign Application Priority Data

Mar. 14, 2022 (JP) ............................. JP2022-039644

(51) Int. Cl.
*G06F 21/57* (2013.01)
*G06F 11/14* (2026.01)

(52) U.S. Cl.
CPC ........ *G06F 21/575* (2013.01); *G06F 11/1417* (2013.01)

(58) Field of Classification Search
CPC ........................... G06F 21/575; G06F 11/1417
See application file for complete search history.

(56) References Cited

U.S. PATENT DOCUMENTS 4,992,958 A * 2/1991 Kageyama ............. G06K 15/00
358/1.17
9,141,816 B2 * 9/2015 Refstrup ............... H04L 9/0819
(Continued)

FOREIGN PATENT DOCUMENTS

JP 2007116671 A 5/2007
JP 2010177737 A 8/2010
(Continued)

OTHER PUBLICATIONS

Office Action for JP Patent Application No. 2022039644, issued on Dec. 9, 2025, 17 pages.

*Primary Examiner* — Lynn D Feild
*Assistant Examiner* — Kelah Janae McFarland-Barnes
(74) *Attorney, Agent, or Firm* — CHIP LAW GROUP

(57) ABSTRACT

An image processing apparatus includes a first printing unit; a printing controller that performs control of the first printing unit; a controller that performs at least control other than control of the first printing unit; a first tampering detector that performs detection of tampering of a first program to be stored in a first non-volatile memory and to be executed by the controller; a second tampering detector that performs detection of tampering of a second program to be stored in a second non-volatile memory and to be executed by the printing controller; and a notification unit that performs a first notification and a second notification with a notification content that differs between the first notification corresponding to a first detection result obtained by the first tampering detector and the second notification corresponding to a second detection result obtained by the second tampering detector.

11 Claims, 7 Drawing Sheets

(56) References Cited

U.S. PATENT DOCUMENTS

| | | | | |
|---|---|---|---|---|
| 10,025,657 | B2 * | 7/2018 | Oku | G06F 11/0793 |
| 10,140,454 | B1 * | 11/2018 | Spath | G06F 21/577 |
| 11,379,589 | B2 * | 7/2022 | Goda | G06F 21/608 |
| 11,669,609 | B2 * | 6/2023 | Michishita | G06F 21/44 726/2 |
| 11,836,048 | B2 * | 12/2023 | Yamashita | G06F 11/1458 |
| 12,316,818 | B2 * | 5/2025 | Kawazu | G06F 21/52 |
| 2007/0047454 | A1 * | 3/2007 | Fujii | G06F 3/121 370/245 |
| 2007/0067681 | A1 | 3/2007 | Hikawa et al. | |
| 2019/0230240 | A1 | 7/2019 | Umimura | |

FOREIGN PATENT DOCUMENTS

| | | | |
|---|---|---|---|
| JP | 2018197991 | A | 12/2018 |
| JP | 2019128792 | A | 8/2019 |
| JP | 2020154601 | A | 9/2020 |

* cited by examiner

IMAGE PROCESSING APPARATUS, NOTIFICATION METHOD, AND NON-TRANSITORY COMPUTER-READABLE STORAGE MEDIUM

The present application is based on, and claims priority from JP Application Serial Number 2022-039644, filed Mar. 14, 2022, the disclosure of which is hereby incorporated by reference herein in its entirety.

BACKGROUND

1. Technical Field

The present disclosure relates to an image processing apparatus, a notification method, and a non-transitory computer-readable storage medium.

2. Related Art

Secure boot is a known function for verifying the validity of a startup program to ensure safety at the time of startup of a computer. A multifunction machine having secure boot functionality is known (see, JP-A-2019-128792).

However, the multifunction machine described in JP-A-2019-128792 verifies the validity of a program to be executed by a central processing unit (CPU) and completes the boot processing regardless of tampering in any location being detected.

SUMMARY

To solve the above-described problem, an aspect of the present disclosure is an image processing apparatus that includes: a first printing unit; a printing control unit that performs control of the first printing unit; a control unit that performs at least control other than control of the first printing unit; a first tampering detection unit that performs detection of tampering of a first program to be stored in a first non-volatile memory and to be executed by the control unit; a second tampering detection unit that performs detection of tampering of a second program to be stored in a second non-volatile memory and to be executed by the printing control unit; and a notification unit that performs a first notification and a second notification with a notification content that differs between the first notification corresponding to a first detection result obtained by the first tampering detection unit and the second notification corresponding to a second detection result obtained by the second tampering detection unit.

Further, an aspect of the present disclosure is a notification method in an image processing apparatus including a first printing unit, a printing control unit that performs control of the first printing unit, and a control unit that performs at least control other than control of the first printing unit, the notification method includes: a first tampering detection step of performing detection of tampering of a first program to be stored in a first non-volatile memory and to be executed by the control unit; a second tampering detection step of performing detection of tampering of a second program to be stored in a second non-volatile memory and to be executed by the printing control unit; and a notification step of performing a first notification and a second notification with a notification content that differs between the first notification corresponding to a first detection result obtained by the first tampering detection step and the second notification corresponding to a second detection result obtained by the second tampering detection step.

Further, an aspect of the present disclosure is a non-transitory computer-readable storage medium storing a program. The program causes a computer of an image processing apparatus including a first printing unit, a printing control unit that performs control of the first printing unit, and a control unit that performs at least control other than control of the first printing unit to execute: a first tampering detection step of performing detection of tampering of a first program to be stored in a first non-volatile memory and to be executed by the control unit; a second tampering detection step of performing detection of tampering of a second program to be stored in a second non-volatile memory and to be executed by the printing control unit; and a notification step of performing a first notification and a second notification with a notification content that differs between the first notification corresponding to a first detection result obtained by the first tampering detection step and the second notification corresponding to a second detection result obtained by the second tampering detection step.

DESCRIPTION OF EXEMPLARY EMBODIMENTS

Figure 1:
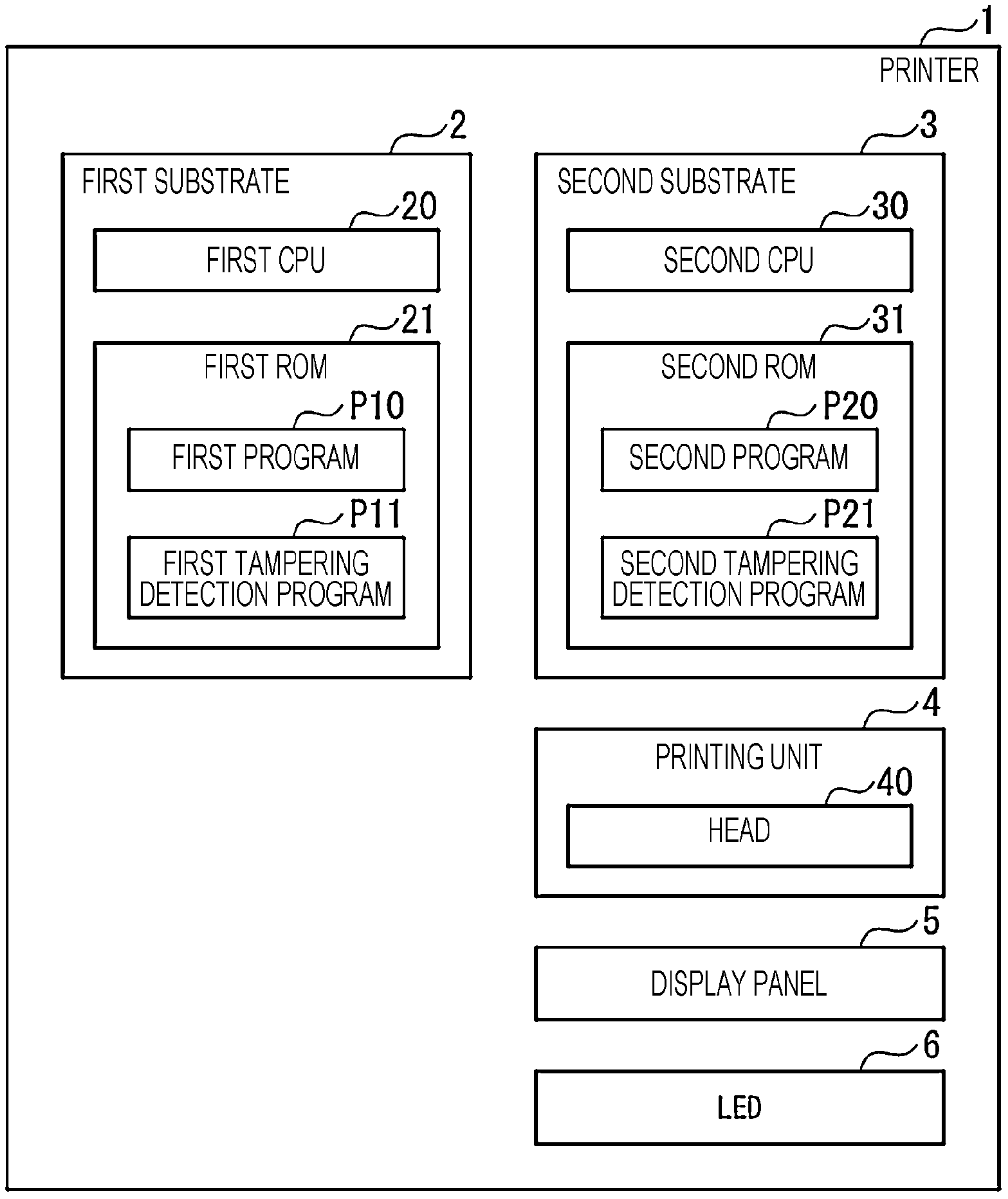
FIG. 1 is a diagram illustrating an example of a configuration of a printer according to an embodiment of the present disclosure.

Hereinafter, embodiments of the present disclosure are described in detail with reference to the drawings. FIG. 1 illustrates an example of a configuration of a printer 1 according to the present embodiment. As an example, the printer 1 is an ink jet printer. The printer 1 includes a first substrate 2, a second substrate 3, a printing unit 4, a display panel 5, and a light emitting diode (LED) 6.

The first substrate 2 includes a first central processing unit (CPU) 20 and a first read-only memory (ROM) 21. The first substrate 2 is also referred to as a main body substrate.

The first CPU 20 loads various types of programs from the first ROM 21 to perform various control according to various types of the loaded programs. The first CPU 20 has a plurality of built-in internal storage media such as registers. The first CPU 20 temporarily stores data from the first ROM in the internal storage media, and performs arithmetic processing on such data. The first CPU 20 outputs a computation result to a register and further from the register to random access memory (RAM). It is to be noted that the RAM is provided on the first substrate 2 and is not illustrated in FIG. 1.

The first ROM 21 is a main storage device that stores various programs, data, parameters, and the like with which the first CPU 20 performs various computations and control. The various programs include a first program P10 and a first tampering detection program P11. The first ROM 21 is configured to hold stored contents even in a state where no electric power is supplied to the first ROM 21.

The first program P10 is a program for executing various control for a main body of the printer 1. The various control includes startup of the main body of the printer 1 and the like. The first program P10 is firmware for the main body of the printer 1. The main body of the printer 1 is a portion excluding the printing unit 4 in the printer 1. Thus, the various control executed by the first program P10 does not include control of the printing unit 4.

The first tampering detection program P11 is a program for executing detection of tampering of the first program P10. In other words, the first tampering detection program P11 is a program for executing secure boot. Secure boot is a function for verifying validity of a startup program to ensure safety at the time of startup of a computer.

The second substrate 3 includes a second CPU 30 and a second ROM 31. As an example, the second substrate 3 is replaceable. The second substrate 3 may be provided on the printer 1 in a non-replaceable manner. The second substrate 3 is also called a head substrate.

The second CPU 30 loads various types of programs from the second ROM 31 to perform various control according to the various types of the loaded programs. The second CPU 30 has a plurality of built-in internal storage media such as registers. The second CPU 30 temporarily stores data from the second ROM 31 in the internal storage media, and performs arithmetic processing on such data. The second CPU 30 outputs a computation result to a register and further from the register to RAM. It is to be noted that the RAM is provided on the second substrate 3 and is not illustrated in FIG. 1.

The second ROM 31 is a main storage device that stores various programs, data, parameters, and the like with which the second CPU 30 performs various computations and control. The various programs include a second program P20 and a second tampering detection program P21. The second ROM 31 is configured to hold stored contents even in a state where no electric power is supplied to the second ROM 31.

The second program P20 is a program for controlling the printing unit 4. The control of the printing unit 4 includes control of an ink jet head. The second program P20 is firmware for the printing unit 4.

The second tampering detection program P21 is a program for executing detection of tampering of the second program P20. In other words, the second tampering detection program P21 is a program for executing the secure boot.

The printing unit 4 performs printing. The printing unit 4 includes a head 40, which is a head for an ink jet method.

The display panel 5 displays various information through the use of characters or images. Further, the display panel 5 accepts operations from a user. The display panel 5 is, for example, a touch panel and displays buttons corresponding to operations from the user. Examples of the display panel 5 include a liquid crystal display panel, an organic electro-luminescence (EL) display panel, and the like.

The LED 6 performs various notifications through an illuminating operation.

Figure 2:
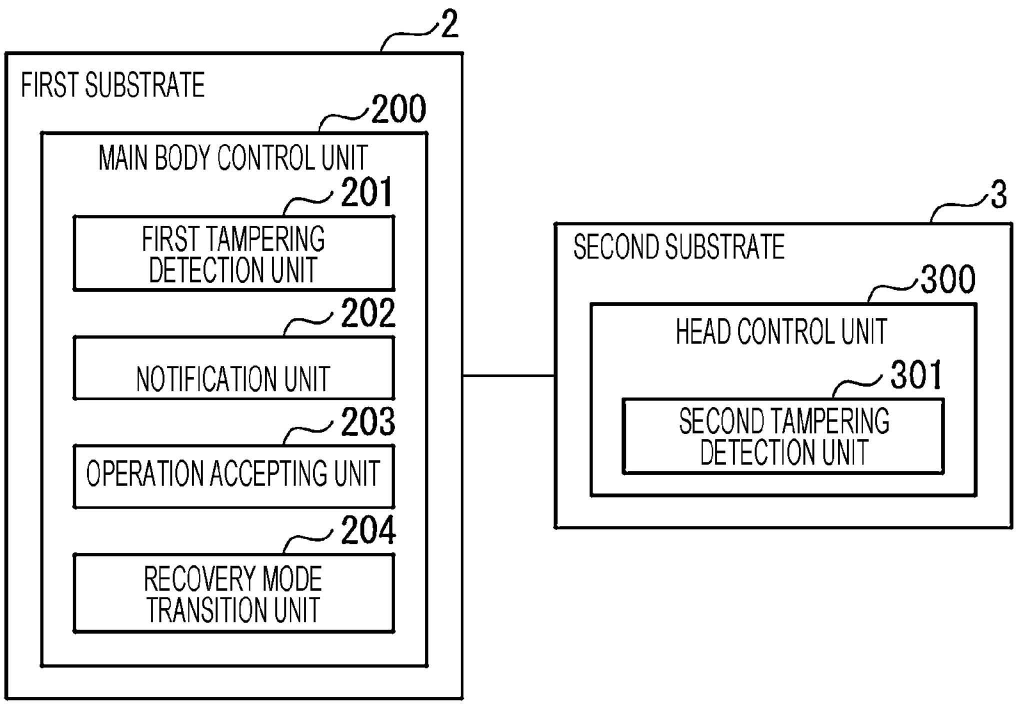
FIG. 2 is a diagram illustrating an example of a functional configuration of a first substrate and a second substrate according to the embodiment of the present disclosure.

FIG. 2 illustrates an example of a functional configuration of the first substrate 2 and the second substrate 3 according to the present embodiment.

A main body control unit 200 is provided on the first substrate 2. The main body control unit 200 performs at least control other than control of the printing unit 4. Operation of the main body control unit 200 is achieved in such a manner that the first CPU 20 executes processing according to the first program P10 loaded from the first ROM 21. The main body control unit 200 includes a first tampering detection unit 201, a notification unit 202, an operation accepting unit 203, and a recovery mode transition unit 204.

A head control unit 300 is provided on the second substrate 3. The head control unit 300 performs control of the printing unit 4. Operation of the head control unit 300 is achieved in such a manner that the second CPU 30 executes processing according to the second program P20 loaded from the second ROM 31. The head control unit 300 includes a second tampering detection unit 301.

The first tampering detection unit 201 performs detection of tampering of the first program P10. The first program P10 is stored in the first ROM 21 and is executed by the main body control unit 200. Operation of the first tampering detection unit 201 is achieved in such a manner that the first CPU 20 executes processing according to the first tampering detection program P11 loaded from the first ROM 21. Processing of detection of tampering of the first program P10 performed by the first tampering detection unit 201 is called first detection processing.

The second tampering detection unit 301 performs detection of tampering of the second program P20. The second program P20 is stored in the second ROM 31 and is executed by the head control unit 300. Operation of the second tampering detection unit 301 is achieved in such a manner that the second CPU 30 executes processing according to the second tampering detection program P21 loaded from the second ROM 31. Processing of detection of tampering of the second program P20 performed by the second tampering detection unit 301 is called second detection processing.

The notification unit 202 performs a first notification and a second notification.

The first notification is a notification corresponding to a first detection result obtained by the first tampering detection unit 201. The first notification includes a notification indicating an intervention technique to a user when tampering of the first program P10 is detected. Examples of the intervention technique include restarting the printer 1, updating the first program P10, or the like. As the first notification, the notification unit 202 illuminates the LED 6.

The second notification is a notification corresponding to a second detection result obtained by the second tampering detection unit 301. The second notification includes, for example, a notification indicating to a user that the printing unit 4 is faulty, or a notification indicating an intervention technique to a user when tampering of the second program P20 is detected. An example of the intervention technique includes replacement of the head 40.

The notification unit 202 performs the first notification and the second notification with notification contents that differ between the first notification corresponding to the first detection result obtained by the first tampering detection unit 201 and the second notification corresponding to the second detection result obtained by the second tampering detection unit 301.

The operation accepting unit 203 accepts operations from a user. Such operations include an operation for restarting the printer 1.

The recovery mode transition unit 204 transitions to a recovery mode after restarting when a predetermined first condition is fulfilled. The predetermined first condition is when tampering is detected by at least one of the first tampering detection unit 201 and the second tampering detection unit 301. Alternatively, the predetermined first condition may be when tampering is detected by both of the first tampering detection unit 201 and the second tampering detection unit 301.

Figure 3:
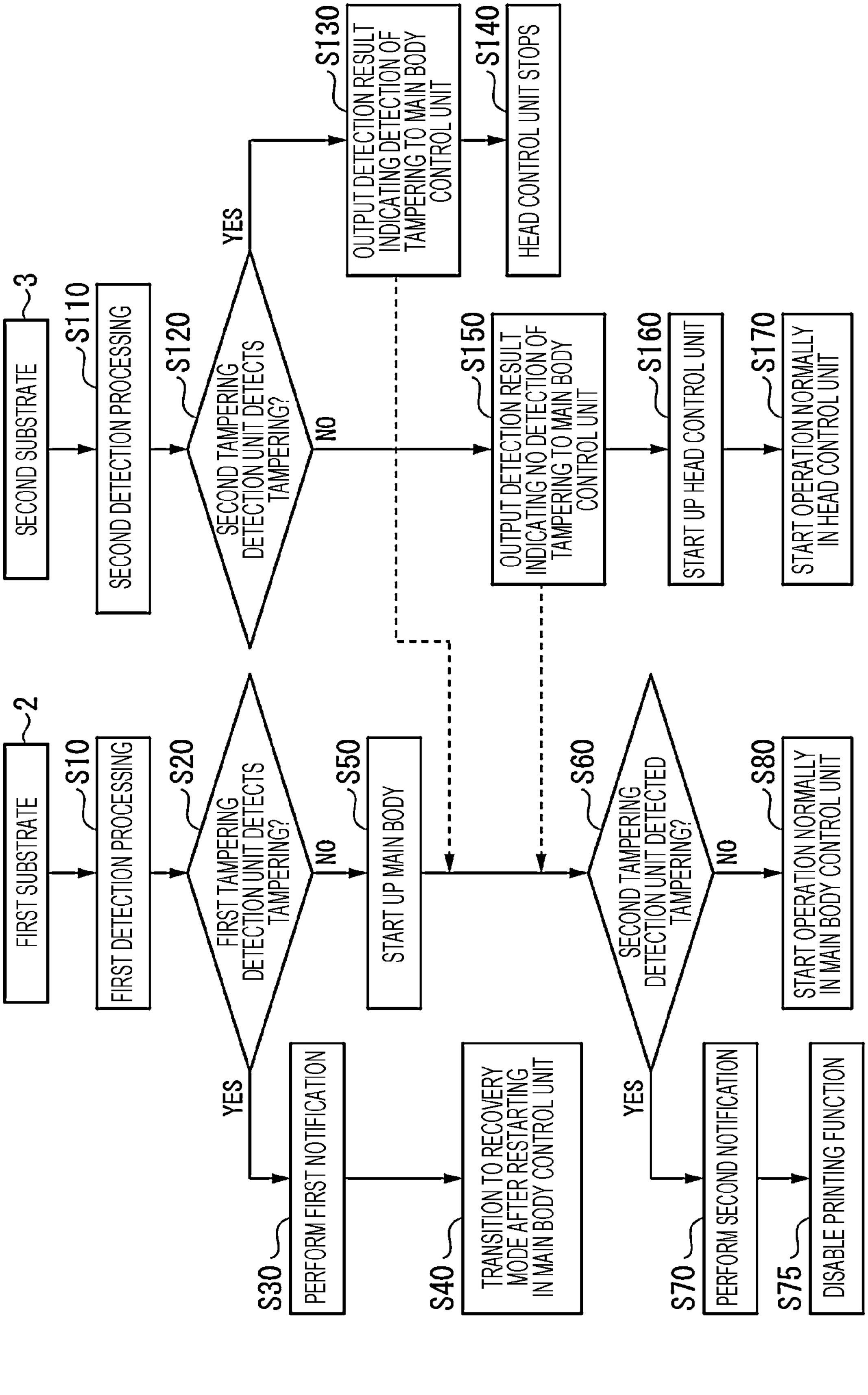
FIG. 3 is a flowchart illustrating an example of main body startup processing and printing unit startup processing according to the embodiment of the present disclosure.

Next, main body startup processing and printing unit startup processing are described with reference to FIG. 3. FIG. 3 illustrates an example of the main body startup processing and the printing unit startup processing according to the present embodiment. The main body startup processing is performed by the main body control unit 200. The printing unit startup processing is performed by the head control unit 300. The main body startup processing and the printing unit startup processing are performed when the printer 1 is switched on. In the present embodiment, the main body startup processing and the printing unit startup processing are performed in parallel.

Step S10: the first tampering detection unit 201 performs the first detection processing. In other words, the first tampering detection unit 201 performs processing for detecting tampering of the first program P10. The first tampering detection unit 201 acquires signature data stored in the first ROM 21. Further, the first tampering detection unit 201 calculates a hash value from the first program P10 stored in the first ROM 21. The first tampering detection unit 201 performs the first detection processing by performing signature verification processing by using a public key, the acquired signature data, and the calculated hash value. The public key is for performing tampering verification. The public key is stored beforehand by the first tampering detection unit 201.

Thereafter, the main body control unit 200 performs processing of step S20.

Step S20: the first tampering detection unit 201 determines whether to detect tampering of the first program P10. When the signature verification processing fails, the first tampering detection unit 201 determines the detection of tampering. When the signature verification processing succeeds, the first tampering detection unit 201 determines no detection of tampering.

When the first tampering detection unit 201 determines the detection of tampering (step S20; YES), the main body control unit 200 performs processing of step S40. In contrast, when the first tampering detection unit 201 determines no detection of tampering (step S20; NO), the main body control unit 200 performs processing of step S50.

Step S30: the notification unit 202 performs the first notification. As the first notification, for example, the notification unit 202 illuminates the LED 6. Thereafter, the main body control unit 200 performs processing of the step S40.

Here, illuminating of the LED 6 means a notification content prompting a user to restart the main body of the printer 1. Therefore, a first notification content of the first notification differs from a notification content indicating failed handling to be described later. It is to be noted that a user preliminarily understands the meaning of the notification content indicated by illuminating of the LED 6 through the use of an instruction manual and the like.

It is to be noted that the LED 6 may flash on and off instead of illuminating continuously. Alternatively, the meaning of the notification content may be distinguished by a color of the LED 6 at the time of illuminating or flashing of the LED 6.

The notification unit 202 may display a character string on the display panel 5 instead of illuminating the LED 6 as the first notification. The notification unit 202 displays, for example, a character string such as "RESTART" on the display panel 5. It is to be noted that, since the display panel 5 is controlled by the main body control unit 200, the display panel 5 is capable of displaying various information after startup of the main body control unit 200. However, the display panel 5 has a function of displaying simple information such as a monochrome character string. This enables the display panel 5 to display, for example, the monochrome character string even before startup of the main body control unit 200.

Further, the notification unit 202 may switch off the display panel 5 by shutting off electric power supplied to the display panel 5 instead of illuminating the LED 6 as the first notification.

Step S40: the recovery mode transition unit 204 transitions to a recovery mode after the main body of the printer 1 is restarted by the main body control unit 200. The main body of the printer 1 is restarted when the operation accepting unit 203 accepts a restart operation from a user. It is to be noted that the main body of the printer 1 may be automatically restarted.

In the recovery mode, for example, the notification unit 202 performs a notification prompting a user to update the first program P10 serving as firmware. The notification unit 202 performs the notification by displaying, for example, a character string such as "UPDATE FIRMWARE" on the display panel 5.

Step S50: the main body control unit 200 starts up. In other words, the first program P10 serving as the firmware of the main body of the printer 1 is activated. Thereafter, the main body control unit 200 performs processing of step S60 when one of step S130 and step S150 to be described later is performed and when the main body control unit 200 acquires the second detection result obtained by the second tampering detection unit 301 from the head control unit 300.

Step S60: the main body control unit 200 determines whether the second tampering detection unit 301 detected tampering of the second program P20. When the main body control unit 200 determines that the second tampering detection unit 301 detected tampering of the second program P20 (step S60; YES), the main body control unit 200 performs processing of step S70. In contrast, when the main body control unit 200 determines that the second tampering detection unit 301 detected no tampering of the second program P20 (step S60; NO), the main body control unit 200 performs processing of step S80.

Figure 4:
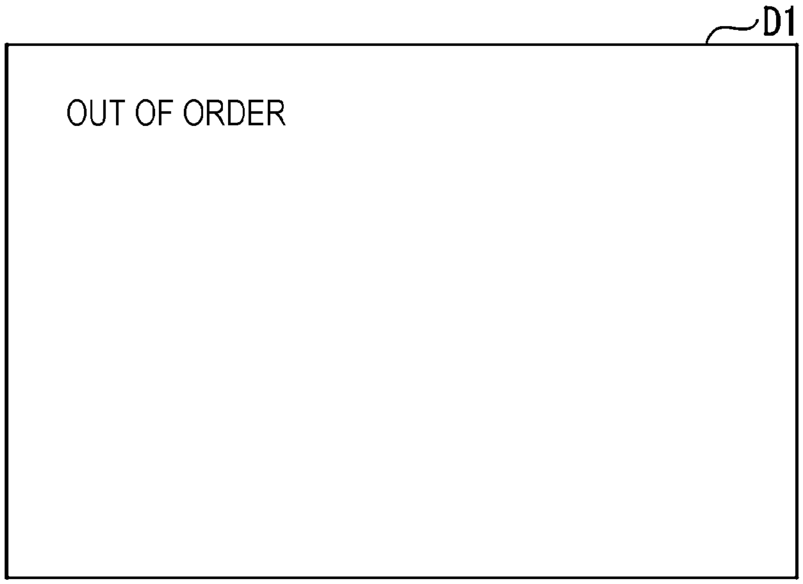
FIG. 4 is a diagram illustrating an example of a failure notification screen according to the embodiment of the present disclosure.

Step S70: the notification unit 202 performs the second notification. As the second notification, for example, the notification unit 202 performs a notification indicating to a user that the printing unit 4 is faulty. In other words, the second notification content of the second notification is a notification content of failed handling. As the second notification, the notification unit 202 displays a failure notification screen D1 on the display panel 5. FIG. 4 illustrates an example of the failure notification screen D1. The failure notification screen D1 includes a character string such as “OUT OF ORDER”. The character string may be “ERROR” or the like.

Thereafter, the main body control unit 200 performs processing of step S75.

Figure 5:
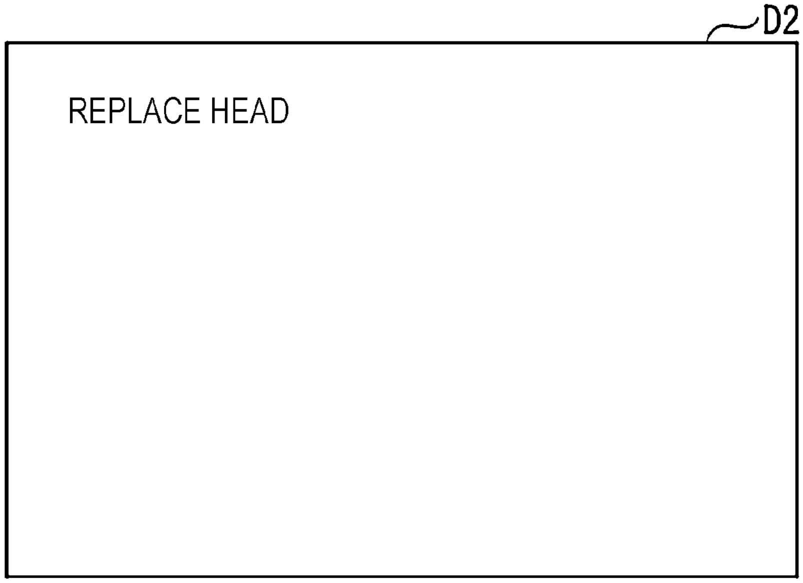
FIG. 5 is a diagram illustrating an example of a head replacement notification screen according to the embodiment of the present disclosure.

It is to be noted that the notification unit 202 may perform a notification prompting a user to replace the head 40 as the second notification. In such a case, the notification unit 202 displays a head replacement notification screen D2 on the display panel 5 as the second notification. FIG. 5 illustrates an example of the head replacement notification screen D2. The head replacement notification screen D2 includes a character string such as “REPLACE HEAD” or the like.

Step S75: the main body control unit 200 disables a printing function. Here, the main body control unit 200 keeps functions other than the printing function in enabled status. Operation of the main body control unit 200 in a state where any functions other than the printing function are enabled with the printing function disabled is also referred to as fallback operation. Thus, the main body control unit 200 starts the fallback operation.

Step S80: the main body control unit 200 starts operation normally.

With the steps described thus far, the main body control unit 200 completes the main body startup processing.

Step S110: the second tampering detection unit 301 performs the second detection processing. In other words, the second tampering detection unit 301 performs processing for detecting tampering of the second program P20. The second tampering detection unit 301 acquires signature data stored in the second ROM 31. Further, the second tampering detection unit 301 calculates a hash value from the second program P20 stored in the second ROM 31. The second tampering detection unit 301 performs the second detection processing by performing signature verification processing by using a public key, the acquired signature data, and the calculated hash value. The public key is for performing tampering verification. The public key is stored beforehand by the second tampering detection unit 301.

Thereafter, the head control unit 300 performs processing of step S120.

Step S120: the second tampering detection unit 301 determines whether to detect tampering of the second program P20. When the signature verification processing fails, the second tampering detection unit 301 determines the detection of tampering. When the signature verification processing succeeds, the second tampering detection unit 301 determines no detection of tampering.

When the second tampering detection unit 301 determines the detection of tampering (step S120; YES), the head control unit 300 performs processing of step S130. In contrast, when the second tampering detection unit 301 determines no detection of tampering (step S120; NO), the head control unit 300 performs processing of step S150.

Step S130: the head control unit 300 outputs a detection result indicating detection of tampering as the second detection result obtained by the second tampering detection unit 301 to the main body control unit 200. Thereafter, the head control unit 300 performs processing of step S140.

Step S140: the head control unit 300 stops.

Step S150: the head control unit 300 outputs a detection result indicating no detection of tampering as the second detection result obtained by the second tampering detection unit 301 to the main body control unit 200. Thereafter, the head control unit 300 performs processing of step S160.

Step S160: the head control unit 300 starts up. In other words, the second program P20 serving as firmware of the printing unit 4 is activated. Thereafter, the head control unit 300 performs processing of step S170.

Step S170: the head control unit 300 starts operation normally.

With the steps described thus far, the head control unit 300 completes the printing unit startup processing.

As described above, the main body startup processing and the printing unit startup processing are performed in parallel. The main body startup processing includes the first detection processing performed by the first tampering detection unit 201. The printing unit startup processing includes the second detection processing performed by the second tampering detection unit 301. Therefore, in the present embodiment, the first detection processing and the second detection processing are performed in parallel.

As described above, the first notification content of the first notification and the second notification content of the second notification include an intervention technique. The intervention technique is a method that enables a user to deal with tampering to ensure normal operation of equipment when tampering is detected in firmware for operating such equipment.

For example, when tampering is detected in the first program P10 serving as firmware of the main body of the printer 1, the intervention technique is a method that enables a user to deal with such tampering to ensure normal operation of the printer 1. In the present embodiment, as an example of the intervention technique when tampering of the first program P10 is detected, the first notification content is a notification content prompting a user to restart the main body of the printer 1.

Further, when tampering is detected in the second program P20 serving as firmware of the printing unit 4, or in any other program, the intervention technique is a method that enables a user to deal with such tampering to ensure normal operation of the printing unit 4. As an example of the intervention technique when tampering of the second program P20 is detected, the second notification content is a notification content prompting a user to replace the head 40.

Here, a first modification example of the present embodiment is described.

In the present embodiment, description is provided on a case when the main body control unit 200 and the head control unit 300 transition to a recovery mode after the main body of the printer 1 is restarted. In the present modification example, description is provided on a case when the head control unit 300 does not transition to the recovery mode after the main body of the printer 1 is restarted. It is to be noted that any component units the same as those in the above-described embodiment are denoted by the same reference numerals, and descriptions of the same configuration and operation are omitted as appropriate.

Figure 6:
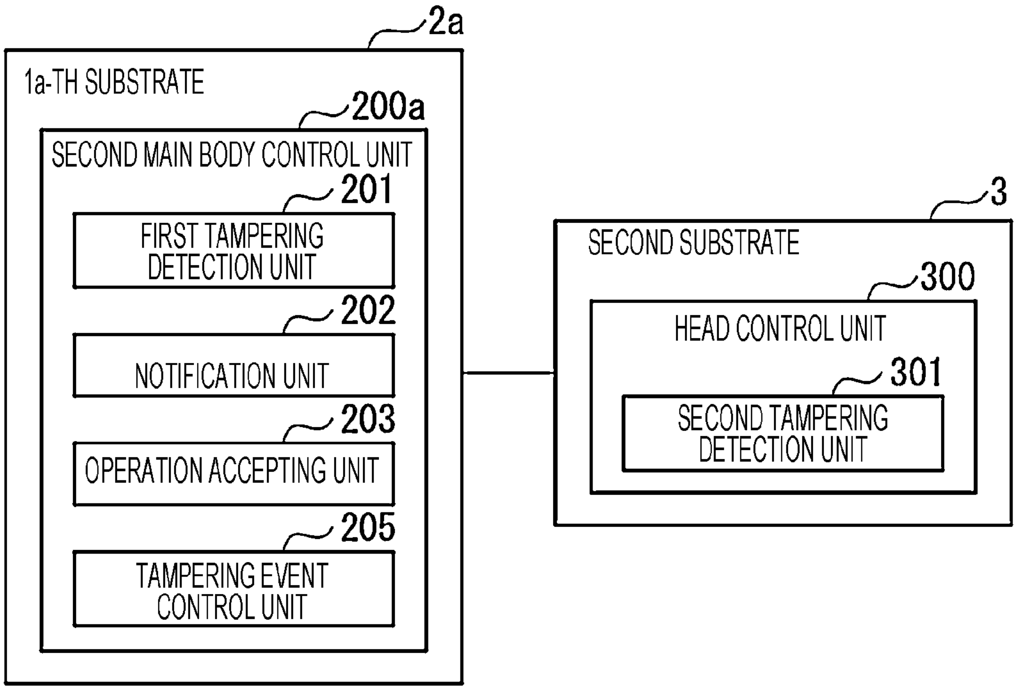
FIG. 6 is a diagram illustrating an example of a functional configuration of a first substrate and a second substrate according to a modification example 1 of the embodiment of the present disclosure.

FIG. 6 illustrates an example of a functional configuration of a 1a-th substrate 2*a* and a second substrate 3 according to the present modification example. When the 1a-th substrate 2*a* and the second substrate 3 according to the present modification example are compared with the first substrate 2 and the second substrate 3 according to the above-described embodiment, a difference exists in that a second main body control unit 200*a* is provided on the 1a-th substrate 2*a*. Here, a configuration of the second substrate 3 is the same as that in the above-described embodiment.

The second main body control unit 200*a* includes a first tampering detection unit 201, a notification unit 202, an operation accepting unit 203, and a tampering event control unit 205. Compared with the main body control unit 200 according to the above-described embodiment, the second main body control unit 200*a* differs from the main body control unit 200 in that the second main body control unit 200*a* includes the tampering event control unit 205 instead of the recovery mode transition unit 204.

When tampering is detected by one of the first tampering detection unit 201 and the second tampering detection unit 301, the tampering event control unit 205 transitions to processing other than processing of transitioning to a recovery mode after restarting. It is to be noted that, when tampering is detected by both of the first tampering detection unit 201 and the second tampering detection unit 301, the tampering event control unit 205 may transition to processing other than the processing of transitioning to the recovery mode after restarting. The processing other than the processing of transitioning to the recovery mode after restarting is, for example, processing of instructing the head control unit 300 to keep a standby state.

Figure 7:
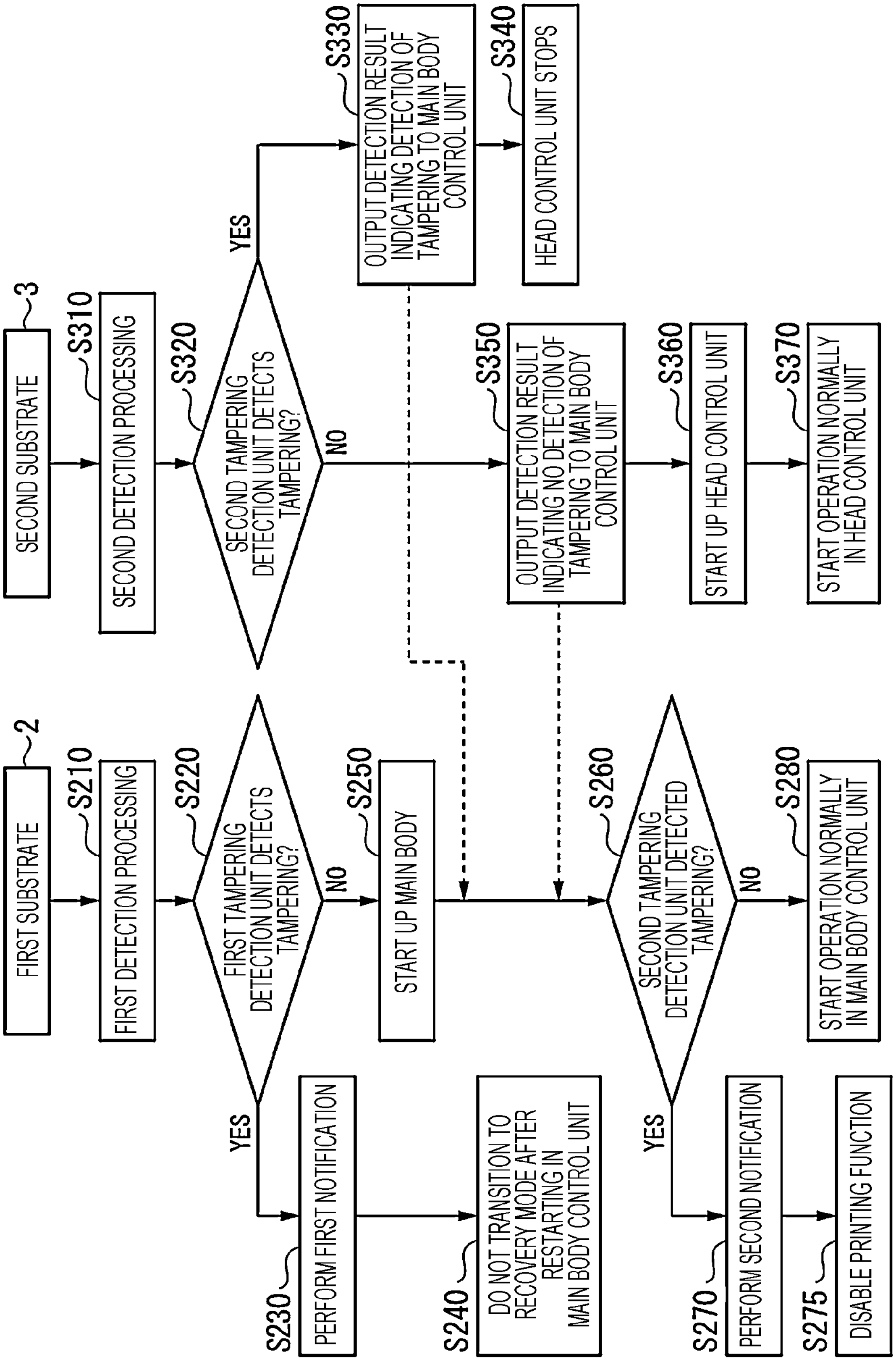
FIG. 7 is a flowchart illustrating an example of main body startup processing and printing unit startup processing according to the modification example 1 of the embodiment of the present disclosure.

FIG. 7 illustrates an example of main body startup processing and printing unit startup processing according to the present modification example. In the present modification example, as with the above-described embodiment, the main body startup processing and the printing unit startup processing are performed in parallel. It is to be noted that each processing step from step S210 to step S230, each processing step from step S250 to step S280, and each processing step from step S310 to step S370 are respectively similar to each processing step from the step S10 to the step S30, each processing step from the step S50 to the step S80, and each processing step from the step S110 to the step S170 in FIG. 3, and thus the descriptions thereof are omitted.

After processing of step S230, the second main body control unit 200*a* performs processing of step S240.

Step S240: the tampering event control unit 205 does not transition to the recovery mode after the printing unit 4 is restarted by the second main body control unit 200*a*. The tampering event control unit 205 transitions to the processing other than the processing of transitioning to the recovery mode. As the processing other than the processing of transitioning to the recovery mode, for example, the tampering event control unit 205 performs processing of instructing the second main body control unit 200*a* to keep a standby state.

After processing of step S330, the head control unit 300 performs processing of step S340.

Step S340: the tampering event control unit 205 does not transition to the recovery mode after the printing unit 4 is restarted by the head control unit 300. The tampering event control unit 205 transitions to the processing other than the processing of transitioning to the recovery mode. As the processing other than the processing of transitioning to the recovery mode, for example, the tampering event control unit 205 performs processing of instructing the head control unit 300 to keep a standby state.

Here, description is provided on a second modification example of the present embodiment.

As described above, in the printing unit startup processing according to the first modification example, transition to the recovery mode is not performed after the printing unit 4 is restarted. In contrast, in the printing unit startup processing according to the above-described embodiment, transition to the recovery mode is performed after the printing unit 4 is restarted. The printer 1 may be provided with a selector switch for switching to transition to the recovery mode after the printing unit 4 is restarted. According to a state of the selector switch, the main body control unit 200 switches between transition to the recovery mode after restarting of the printing unit 4 through functioning of the recovery mode transition unit 204 and no transition to the recovery mode after restarting of the printing unit 4 through functioning of the tampering event control unit 205.

Here, a third modification example of the present embodiment is described.

It is to be noted that, in the above-described embodiment and first modification example, a description of an example of a case when the main body startup processing and the printing unit startup processing are performed in parallel is provided but is not limited to this. The main body startup processing and the printing unit startup processing may be sequentially performed. For example, after the processing from the step S110 to the step S170 illustrated in FIG. 3 is performed as the printing unit startup processing, the processing from the step S10 to the step S80 may be performed as the main body startup processing. When the processing from the step S10 to the step S80 is performed as the main body startup processing after the processing from the step S110 to the step S170 illustrated in FIG. 3 is performed as the printing unit startup processing, in the step S130 and the step S150, the head control unit 300 causes RAM (not illustrated) provided on the first substrate 2 or the 1a-th substrate 2*a* to store a second detection result. In the step S60, the main body control unit 200 determines whether the second tampering detection unit 301 detected tampering of the second program P20 in accordance with the second detection result stored in the RAM.

As another example, after the processing from the step S10 to the step S50 illustrated in FIG. 3 is performed as the main body startup processing, the processing from the step S110 to the step S170 is performed as the printing unit startup processing, and thereafter the processing from the step S60 to the step S80 may be performed as the main body startup processing.

Here, a fourth modification example of the present embodiment is described.

In the above-described embodiment, description is provided on a case when the printer 1 includes two substrates of the first substrate 2 and the second substrate 3. In the present modification example, description is provided on a case when the printer 1 includes a third substrate 7*b* as a single substrate. It is to be noted that any component units the same as those in the above-described embodiment are denoted by the same reference numerals, and descriptions of the same configuration and operation are omitted as appropriate.

Figure 8:
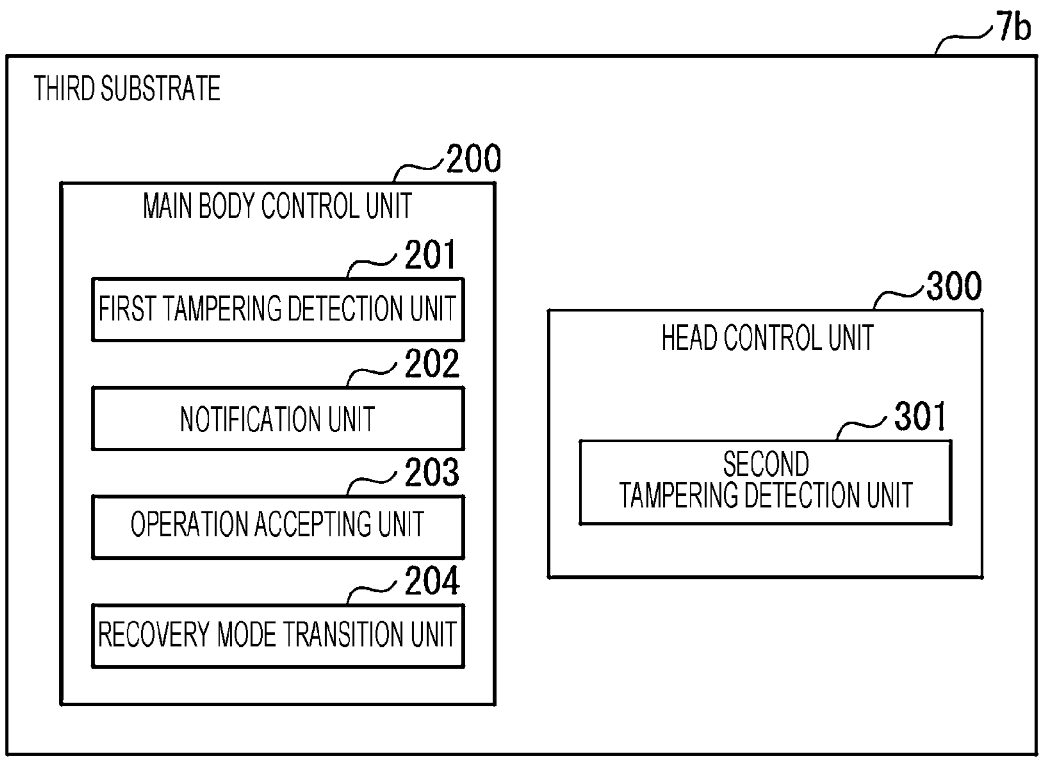
FIG. 8 is a diagram illustrating an example of a functional configuration of a third substrate according to a modification example 4 of the embodiment of the present disclosure.

FIG. 8 illustrates an example of a functional configuration of the third substrate 7*b* according to the fourth modification example of the present embodiment. A main body control unit 200 and a head control unit 300 are provided on the third substrate 7*b*. The functional configuration of the main body control unit 200 provided on the third substrate 7*b* is similar to the functional configuration of the main body control unit 200 provided on the first substrate 2. The functional configuration of the head control unit 300 provided on the third substrate 7*b* is similar to the functional configuration of the head control unit 300 provided on the second substrate 3.

It is to be noted that, in the above-described embodiment and modification examples, a description of an example of a case when the first program P10 and the second program P20 are different programs is provided but is not limited to this. The first program P10 and the second program P20 may be integrated as a single program.

It is to be noted that, in the above-described embodiment and modification examples, a description of an example of a case when a printer is an ink jet printer is provided but is not limited to this. The printer may be a serial head printer, a line head printer, or a laser printer.

It is to be noted that, in the above-described embodiment and modification examples, a description of an example of a case when an image processing apparatus is a printer is provided but is not limited to this. The image processing apparatus may be a multifunction machine with a printing function.

As described above, an image processing apparatus according to the present embodiment includes a first printing unit, a printing control unit, a control unit, a first tampering detection unit 201, a second tampering detection unit 301, and a notification unit 202.

The printing control unit controls the first printing unit.

The control unit performs at least control other than control of the first printing unit.

The first tampering detection unit 201 detects tampering of a first program P10 that is stored in a first non-volatile memory and that is executed by the control unit.

The second tampering detection unit 301 detects tampering of a second program P20 that is stored in a second non-volatile memory and that is executed by the printing control unit.

The notification unit 202 performs a first notification and a second notification with a notification content that differs between the first notification corresponding to a first detection result obtained by the first tampering detection unit 201 and the second notification corresponding to a second detection result obtained by the second tampering detection unit 301.

In the present embodiment, the printer 1 is an example of the image processing apparatus. The printing unit 4 is an example of the first printing unit. The head control unit 300 is an example of the printing control unit. The main body control unit 200 is an example of the control unit. The first ROM 21 is an example of the first non-volatile memory. The second ROM 31 is an example of the second non-volatile memory.

This configuration enables the image processing apparatus according to the present embodiment to perform the first notification and the second notification with a notification content that differs between the first notification corresponding to the first detection result and the second notification corresponding to the second detection result. This makes it possible to notify a user of a notification content that differs between a case when tampering of the first program P10 is detected and a case when tampering of the second program P20 is detected.

Further, in the image processing apparatus according to the present embodiment, the first notification content of the first notification and the second notification content of the second notification include an intervention technique.

This configuration enables the image processing apparatus according to the present embodiment to notify a user of the intervention technique when tampering of the first program P10 is detected or when tampering of the second program P20 is detected.

Further, in the image processing apparatus according to the present embodiment, the first notification content of the first notification is a notification content that differs from a notification content of failed handling, and the second notification content of the second notification is the notification content of failed handling.

This configuration enables the image processing apparatus according to the present embodiment to notify a user of the notification content of failed handling only when tampering of the second program P20 is detected. The user is not notified of the notification content of failed handling when tampering of the first program P10 is detected. This makes it possible to notify a user of an appropriate notification content depending on the type of program whose tampering is detected. The notification content different from the notification content of failed handling is, for example, a notification content prompting a user to restart the main body of the printer 1, as described above.

Further, in the image processing apparatus according to the present embodiment, the control unit is provided on the first substrate 2, and the printing control unit is provided on the second substrate 3, which is replaceable.

This configuration enables the image processing apparatus according to the present embodiment to deal with tampering by replacing the second substrate 3 when tampering of the second program P20 is detected.

Further, in the image processing apparatus according to the present embodiment, the first detection processing performed by the first tampering detection unit 201 and the second detection processing performed by the second tampering detection unit 301 are performed in parallel.

With this configuration, the image processing apparatus according to the present embodiment performs the first detection processing and the second detection processing in parallel. This makes it possible to shorten the time taken for the first detection processing and the second detection processing compared with a case when the first detection processing and the second detection processing are sequentially performed.

Moreover, the image processing apparatus according to the present embodiment includes the recovery mode transition unit 204. The recovery mode transition unit 204 transitions to a recovery mode after restarting when a predetermined first condition is fulfilled. The predetermined first condition is when tampering is detected by at least one of the first tampering detection unit 201 and the second tampering detection unit 301, or when tampering is detected by both of the first tampering detection unit 201 and the second tampering detection unit 301.

This configuration enables the image processing apparatus according to the present embodiment to transition to the recovery mode after restarting when tampering is detected in one or both of the first program P10 and the second program P20. This enables the recovery mode to deal with tampering when tampering is detected.

Further, the image processing apparatus according to the first modification example of the present embodiment includes the tampering event control unit 205. The tampering event control unit 205 transitions to processing other than processing of transitioning to the recovery mode after restarting when tampering is detected by one or both of the first tampering detection unit 201 and the second tampering detection unit 301.

With this configuration, in the image processing apparatus according to the first modification example of the present embodiment, when tampering is detected in one or both of the first program P10 and the second program P20, it is possible to transition to any processing other than the recovery mode when transition to the recovery mode after restarting is inappropriate.

Further, in the image processing apparatus according to the present embodiment, the first program P10 and the second program P20 are different programs.

This configuration enables the image processing apparatus according to the present embodiment to perform detection of tampering of the first program P10 and detection of tampering of the second program P20 independently.

Further, in the image processing apparatus according to the present embodiment, the first printing unit includes an ink jet head.

This configuration enables the image processing apparatus according to the present embodiment to notify a user of the second notification when tampering is detected in the second program P20 to be executed by the printing control unit that performs at least control of the ink jet head.

It is to be noted that functions of a portion of the image processing apparatus according to the above-described embodiment, such as functions of the control unit and the printing control unit, may be achieved with the use of a computer. In such a case, this may be achieved by storing programs for achieving such control functionality on a computer-readable storage medium and causing a computer system to load the programs stored on the storage medium and execute the programs. It is to be noted that "computer system" described here denotes a computer system built into the image processing apparatus that includes hardware such as an OS and peripheral apparatuses. Further, "computer-readable storage medium" denotes a portable storage medium such as a flexible disk, a magneto-optical disk, a ROM, a CD-ROM, and a storage device such as a hard disk built into the computer system. Further, "computer-readable storage medium" may include a medium that transiently and dynamically holds programs, such as a communication line that transmits programs over a network such as the Internet and a communication line such as a telephone line, and a medium that holds programs for a certain period, such as a volatile memory built into a computer system serving as a server or a client in a case described above. Moreover, the above-described programs may be programs for achieving a portion of the above-described functions and may further be programs enabling the above-described functions to be achieved in combination with programs already stored in a computer system.

Further, a functional configuration of a portion of or all of the image processing apparatus according to the above-described embodiment may be achieved as an integrated circuit, such as a large-scale integration (LSI). Each functional block of the image processing apparatus may be configured individually as a processor. Alternatively, some or all of the functional blocks may be integrated as a processor. In addition, a method of an integrated-circuit-based functional block configuration is not limited to an LSI and may be achieved using a dedicated circuit or a general-purpose processor. Further, when a technology of the IC-based functional block configuration alternative to the LSI emerges due to advances in semiconductor technology, an integrated circuit adopting such a technology may be used.

The embodiment of the present disclosure is described in detail with reference to the drawings; however, specific configurations are not limited to those described above, and various design changes and the like may be made without departing from the scope of the present disclosure.

What is claimed is:

1. An image processing apparatus comprising:

a first printing unit;

a printing controller that performs control of the first printing unit;

a controller that performs at least control different from the control of the first printing unit;

a first tampering detector that performs detection of tampering of a first program to be stored in a first nonvolatile memory and to be executed by the controller;

a second tampering detector that performs detection of tampering of a second program to be stored in a second nonvolatile memory different from the first nonvolatile memory and to be executed by the printing controller; and a notification unit that performs a first notification and a second notification with a notification content that differs between the first notification corresponding to a first detection result obtained by the first tampering detector and the second notification corresponding to a second detection result obtained by the second tampering detector, wherein the notification content of the first notification includes one of an intervention technique to restart the image processing apparatus or an intervention technique to update the first program.

2. The image processing apparatus according to claim 1, wherein the notification content of the second notification includes an intervention technique.

3. The image processing apparatus according to claim 2, wherein the notification content of the first notification differs from a notification content of failed handling, and the notification content of the second notification is the notification content of failed handling.

4. The image processing apparatus according to claim 1, wherein the controller is provided on a first substrate, and the printing controller is provided on a second substrate, the second substrate being configured to be replaced.

5. The image processing apparatus according to claim 1, wherein first detection processing performed by the first tampering detector and second detection processing performed by the second tampering detector are performed in parallel.

6. The image processing apparatus according to claim 1, further comprising a recovery mode transition unit that transitions to a recovery mode after restarting when a predetermined first condition is fulfilled, wherein the predetermined first condition is at least one of the first tampering detector detects the tampering of the first program or the second tampering detector detects the tampering of the second program, or each of the first tampering detector detects the tampering of the first program and the second tampering detector detects the tampering of the second program.

7. The image processing apparatus according to claim 1, further comprising a tampering event controller that transitions to processing different from processing of transitioning to a recovery mode after restarting when one of the first tampering detector detects the tampering of the first program or the second tampering detector detects the tampering of the second program, or each of the first tampering detector detects the tampering of the first program and the second tampering detector detects the tampering of the second program.

8. The image processing apparatus according to claim 1, wherein the first program and the second program are different programs.

9. The image processing apparatus according to claim 1, wherein the first printing unit includes an ink jet head.

10. A notification method, comprising:
in an image processing apparatus that includes a first printing unit, a printing controller, a controller, a first tampering detector, a second tampering detector, and a notification unit:
performing, by the printing controller, control of the first printing unit;
performing, by the controller, at least control different from the control of the first printing unit;
performing, by the first tampering detector, detection of tampering of a first program to be stored in a first nonvolatile memory and to be executed by the controller;
performing, by the second tampering detector, detection of tampering of a second program to be stored in a second nonvolatile memory different from the first nonvolatile memory and to be executed by the printing controller; and
performing, by the notification unit, a first notification and a second notification with a notification content that differs between the first notification corresponding to a first detection result obtained by the first tampering detector and the second notification corresponding to a second detection result obtained by the second tampering detector, wherein the notification content of the first notification includes one of an intervention technique to restart the image processing apparatus or an intervention technique to update the first program.

11. A non-transitory computer-readable medium having stored thereon, computer-executable instructions which, when executed by an image processing apparatus, cause the image processing apparatus to execute operations, the operations comprising:
performing, by a printing controller, control of a first printing unit, wherein
the image processing apparatus includes the first printing unit, the printing controller, a controller, a first tampering detector, a second tampering detector, and a notification unit;
performing, by the controller, at least control different from the control of the first printing unit;
performing, by the first tampering detector, detection of tampering of a first program to be stored in a first nonvolatile memory and to be executed by the controller;
performing, by the second tampering detector, detection of tampering of a second program to be stored in a second nonvolatile memory different from the first nonvolatile memory and to be executed by the printing controller; and
performing, by the notification unit, a first notification and a second notification with a notification content that differs between the first notification corresponding to a first detection result obtained by the first tampering detector and the second notification corresponding to a second detection result obtained by the second tampering detector, wherein the notification content of the first notification includes one of an intervention technique to restart the image processing apparatus or an intervention technique to update the first program.

* * * * *